Nov. 4, 1958  H. B. BABSON  2,858,800
LANE-TYPE STALL
Filed Dec. 27, 1954  3 Sheets-Sheet 1

INVENTOR.
Henry B. Babson
BY
Schroeder, Hofgren, Brady & Wegner
attorneys

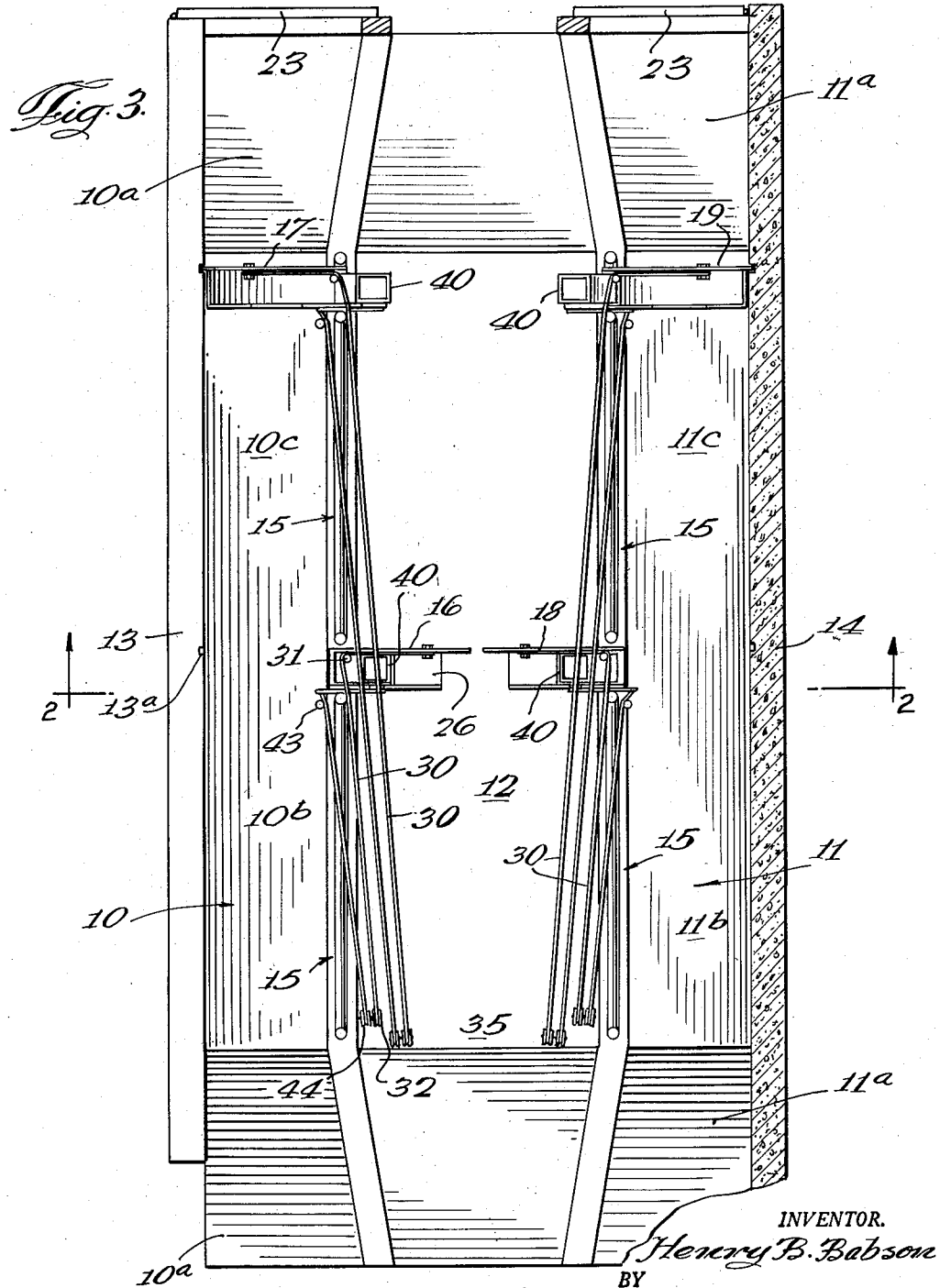

Nov. 4, 1958
H. B. BABSON
2,858,800
LANE-TYPE STALL
Filed Dec. 27, 1954
3 Sheets-Sheet 3
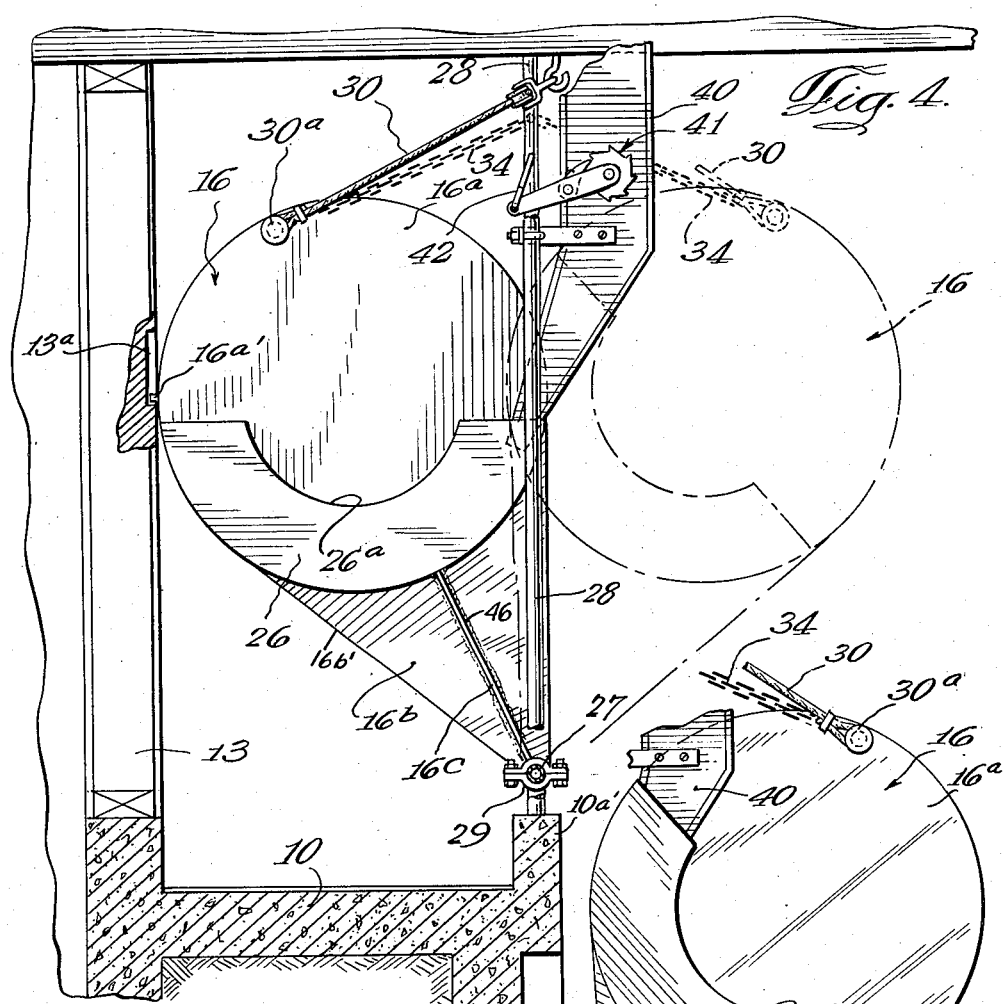
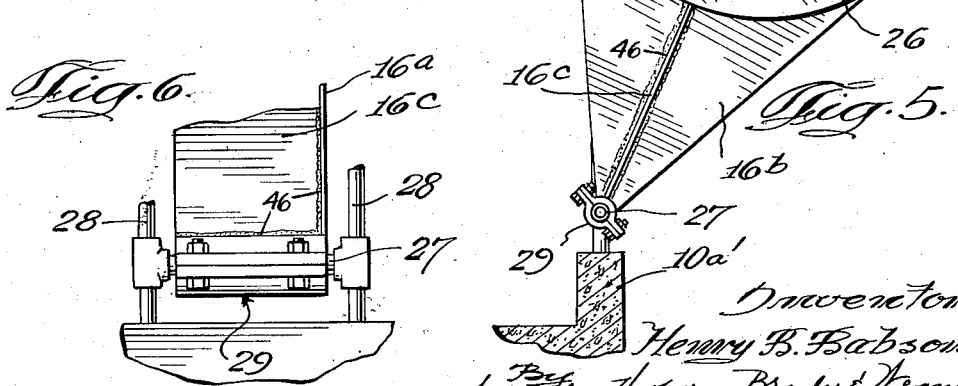
Inventor
Henry B. Babson
By Schroeder, Hofgren, Brady & Wegner
Attorneys United States Patent Office 2,858,800
Patented Nov. 4, 1958

2,858,800

LANE-TYPE STALL

Henry B. Babson, Chicago, Ill., assignor to Babson Bros. Co., a corporation of Illinois Application December 27, 1954, Serial No. 477,692

5 Claims. (Cl. 119—14.03)

This invention is concerned with a stall structure for retaining an animal during milking and more particularly with a "lane-type" stall for use in a milking parlor.

The primary purpose of the present invention is to provide a new and improved stall structure by virtue of which the movements of several animals into and through various stalls may be controlled by a single operator from one point.

One feature of the invention is the provision of a stall comprising means defining the sides of an enclosure, an end member for the enclosure and means for pivotally mounting the end member about an axis longitudinal of the stall whereby the end member may be rotated from a first position to a second position, closing the end of the stall in only one of the positions.

Another feature is the provision of a stall comprising means defining the sides of an enclosure, an end member for the enclosure, means for mounting the end member for movement into and out of position closing the end of the stall and operating means remote from the end member for effecting the movement thereof.

A further feature is the provision of such a stall including a feed receptacle, means for delivering feed to the receptacle, an operator's station remote from both the movable end member and the feed delivery means and means at the operator's station for effecting movement of the end member and for actuating the feed delivery means.

Still another feature is the provision of a plurality of generally longitudinally aligned, contiguous stalls with a plurality of movable end members, and operating means remote from the end members for effecting movement thereof into and out of position closing the respective stalls.

Yet a further feature is the provision in a milking parlor having a pair of spaced animal supporting floors with an operator's alley therebetween of a stall arrangement including a plurality of stalls on each of the floors with an end member for each of the stalls, means for movably mounting the end members, an operator's station remote from the end members, and means at the operator's station for effecting movement of the end members.

Still another feature is that the end member of the stall is mounted on a member extending longitudinally of the stall between a pair of upright members placed at one end thereof. A further feature is the provision of stop means for limiting the movement of the end member. Yet a further feature is the provision of cooperating means on the end member and on the side of the stall opposite the pivotal mounting thereof for increasing the rigidity of the end member when in position closing the end of the stall.

Further features and advantages will readily be apparent from the following specification and from the drawings, in which:

Figure 3 is a top plan view of such a milking parlor;

Figure 4 is an enlarged elevational view illustrating details of the end member;

Figure 5 is an enlarged view similar to Figure 4 showing the end member in open position; and Figure 6 is a fragmentary detailed view of the pivotal mounting arrangement of the end member.

Figure 1:
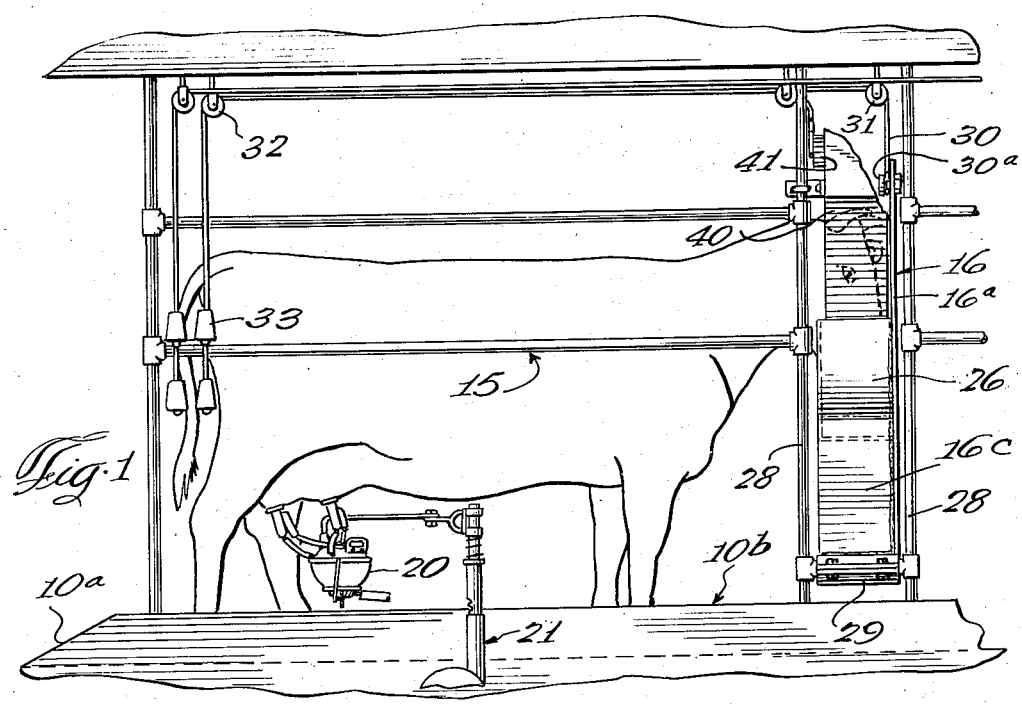
Figure 1 is a fragmentary side elevation view of an installation embodying the invention, showing substantially only one stall.

The trend in modern dairy farming is away from the conventional stanchion barn in which the animals are secured in long rows of side-by-side stalls and the milking apparatus carried to them. Such arrangements are rapidly being replaced by milking parlors. When parlor milking is used, the animals are preferably kept in pens or loafing barns where they may roam at will, eat hay or other fodder, or obtain water. At milking time the animals come or are brought to the milking parlor which is provided with a plurality of stalls and the necessary milking apparatus. After the milking of a particular animal has been completed, the animal leaves the milking parlor and returns to the loafing barn or moves on to the pasture while another animal takes its place in the parlor. Very often milk carry-away pipe line systems are used, the milk flowing directly from the animals to holding tanks, coolers or the like. In arrangements of this kind, not only can one operator milk many more cows efficiently and with less physical work, but the cows often give more milk.

The present invention is concerned with a stall of the lane or walk-through type which is particularly adapted for use in a milking parlor.

Referring now to the drawings, a milking parlor is illustrated having two spaced animal supporting floors 10 and 11 with an operator's alley 12 therebetween. The operator's alley is preferably between 2½ and 3 feet below the animal floors 10 and 11 so that the animal's udder and the milking apparatus are at a handy height for the operator. Ramps 10a and 11a are provided at either end of the cow supporting floors to facilitate access thereto. Of course, local terrain conditions may permit the elimination of one or more of the ramps.

In the milking parlor shown in the drawings, walls 13 and 14 of the building each form a side along one of the cow aisles. The other side of the animal supporting floors are separated from the operator's alley 12 by stall structure comprising vertically and horizontally disposed members indicated generally as 15 which may, for example, be iron pipe.

Each of the animal supporting floors 10 and 11 is divided into two longitudinally aligned stalls 10b, 10c, 11b and 11c and the forward end of each of these stalls is closed by a movable end member indicated respectively as 16, 17, 18 and 19. In practice, two animals are let into the milking parlor by entrance gates (not shown) and pass through stalls 10b and 11b into stalls 10c and 11c, end members 17 and 19 being closed. End members 16 and 18 are then closed and two more animals admitted one to stall 10b and the other to stall 11b.

After the usual preliminaries, such as washing the cow's udder, the milking apparatus, indicated generally as 20, Figure 1, is applied to the animal's teats and the milking operation begun. The milking apparatus shown in Figure 1 forms a part of a carry-away milking system and the particular structure shown is described in detail in copending Thomas application, Serial No. 219,692, filed April 6, 1951, now Patent 2,706,965, dated April 26, 1955. The milking apparatus is carried by an adjustable supporting apparatus indicated generally as 21 and described and claimed in copending Thomas application, Serial No. 258,855, filed November 29, 1951, now Patent 2,747,544, dated May 29, 1956. Reference may also be had to Thomas application, Serial No. 237,922, filed July 20, 1951, now Patent 2,709,416, dated May 31, 1955, and to Merritt Patent 2,683,437 for further details of the construction and operation of the system.

After the milking operation is completed the milk withdrawing apparatus is removed from the animal's teats and the appropriate end members of the stall moved out of the closed position permitting the animals to leave. Normally the milking operation will be first begun on the animals in the forward stalls, 10c and 11c, so that they will be finished first and may leave as soon as end members 17 and 19 are moved to the open position. After the animals in stalls 10b and 11b have been milked out, end members 16 and 18 are moved to open position and the animals may pass out through stalls 10c and 11c, respectively. Swinging doors 23 may be provided to permit the animals to leave the milking parlor readily while providing protection for the operator during inclement weather.

End members 16, 17, 18 and 19 are similar in construction and operation and only one, 16, will be described in detail.

End member 16, Figures 4, 5 and 6, includes a generally circular panel 16a which has a diameter substantially equal to the width of the stall 10b, as for example 34 inches. A tapered panel 16b is formed integrally with the circular member 16a, the sides thereof being tangent to the periphery of panel 16a. Secured to the inside of the end member 16 is a receptacle 26 in which may be placed grain or other food to allow the animals to feed while they are being milked. The feed receptacle 26 confroms generally to the circular configuration of panel 16a and is slightly less than a semicircle in extent. The side of the feed receptacle 26 facing the animal is cut away at 26a permitting ready access thereto. A plate 16c extends generally downwardly from the underside of feed receptacle 26 toward the vertex of plate 16b and is secured to both as by welding at 46, adding strength to the end member. The entire end plate and feed receptacle assembly is mounted on a pipe 27 which extends longitudinally of the stall between a pair of upright members 28 at the forward end thereof. An elongated split collar 29 is secured to the end member and provides a pivotal connection with pipe 27. The pipe 27 is preferably positioned a few inches above the curb 10a' along the side of the animal floor so that the pivotal connection of end member 16 is as low as possible.

Movement of end member 16 between closed and open positions, as shown in solid and broken lines respectively in Figure 4, is readily effected from a remote point by means of a rope 30 which is connected to the periphery of circular panel 16a and passes over pulleys 31 and 32 to a weighted operating handle 33 at the rear of stall 10b. The point of connection, 30a, of rope 30 to panel 16 preferably lies on or near a line drawn through the pivot point of the end member on pipe 27 and the center of gravity of circular panel 16a. A pull on operating handle 33 causes end member 16 to move to the right, Figure 4, and the rope is then released permitting the momentum of the end member to carry it over center (i. e., past that point at which the center of gravity is highest) and swing out into the operator's alley 12. A chain 34 secured between point 30a and upright member 28 acts as a stop limiting the movement of end member 16. A similar operation causes the end member to swing back into the stall. The lower portion 16b of the end member has an edge 16b' extending from the pivotal mouting point and tangent to portion 16a, the end member leaving the stall completely open when swung into operator's alley 12.

Figure 2:
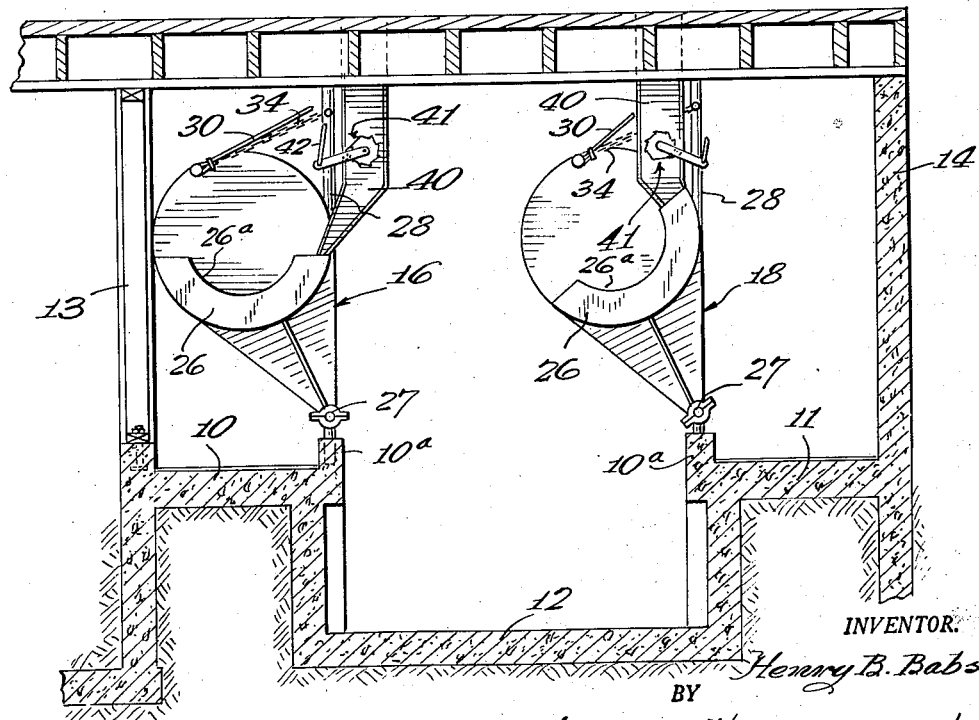
Figure 2 is a transverse section taken generally along line 2—2 of Figure 3, but showing only one end member open.

As illustrated in Figure 3, the width of the stall end members and the width of the operator's alley 12 are so related that adjacent end members, as 16 and 18, may both be swung into the operator's alley at the same time. Preferably, the operator's alley is slightly wider than twice the width of the swinging end members. Furthermore, the operator may walk through the alley even though adjacent end members are open by merely stooping slightly. As best seen in Figures 1–3, the operating ropes 30 for end members 16 and 17 on one side and 18 and 19 on the other pass over suitable pulleys and extend to the rear of stalls 10b and 11b respectively. Thus, an operator may station himself at a point 35 between the rear ends of these two stalls and from this point may operate all four of the stall end members, controlling the movement of the animals therethrough as desired.

A loft area above the milking parlor may be utilized for grain storage and gravity feed dispensers provided for delivering grain or other feed directly from the loft to feed receptacles in the individual stalls; or such feed chutes may be used in conjunction with hoppers filled before each milking. As shown in the drawings herein a chute 40 extends downwardly adjacent the forward end of each stall and projects into the feed receptacle on each stall end member. A suitable measuring dispenser (not shown) inside each of the chutes 40 may be operated by a ratchet and pawl arrangement 41 to deliver the desired amount of feed to each of the feed receptacles. A rope and pulley, as rope 42 and pulleys 43 and 44, associated with each dispenser permits feeding of the animals from operator's station 35.

A projection or tab 16a' on the edge of end member 16 extends into a cooperating slot 13a provided in wall 13 to add stability to the end member when in closed position.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In an animal milking parlor, a stall of the character described, comprising: means defining the sides of an enclosure adapted to retain an animal during milking; an end member for closing an end of said enclosure to block the passage of an animal therethrough; means arranged at one side of the enclosure for mounting said end member for pivotal movement about an axis extending substantially longitudinally of the enclosure from a first position closing said end of the enclosure to a second position out of the path of an animal passing through the enclosure, the center of gravity of said end member lying on one side of said axis when the member is in the first position and lying on the other side of said axis when the member is in the second position, and remotely operable means connected to said end member for moving said member from either of said positions toward the other position a distance at least sufficient to carry said center of gravity to and beyond a point vertically above said axis.

2. The apparatus of claim 1 in which said remotely operable means includes a rope having a portion extending downwardly to said member and connected thereto adjacent the top thereof so that said rope portion is in a substantially vertical position when the center of gravity of said member is vertically above said axis.

3. In a milking parlor having a pair of parallel milking stalls separated by an operator's alley with the alley having a width not substantially greater than the sum of the widths of the stalls, animal control means, comprising: an end member for each stall, said end members being opposite each other and mounted for pivotal movement about parallel axes extending longitudinally of the stalls, said end members each having a portion of enlarged area remote from said pivotal axes with the area of the members being reduced adjacent said axes, said members being pivotally movable from a first position wherein said enlarged areas are positioned each in its associated stall to block the passage of animals therethrough to a second position wherein said enlarged areas are positioned in the alley, and stop means operatively associated with each end member to hold the end members in said second position at points sufficiently spaced above the alley floor to permit an operator readily to pass therebeneath.

4. The apparatus of claim 3 in which the enlarged portion of each of said members is provided with an upwardly concave arcuate feed trough, the ends of each feed trough lying in a substantially horizontal plane when the members are in the first position, and lying in a steeply inclined plane when the members are in the second position thereby to facilitate drainage from each trough when its associated member is in said second position.

5. The apparatus of claim 3 in which the enlarged portion of each of said members is semi-circular in shape with each member having a portion tapering from the enlarged portion to the reduced portion.

References Cited in the file of this patent

UNITED STATES PATENTS

| | | |
|---|---|---|
| 1,304,845 | Barnes | May 27, 1919 |
| 2,081,947 | McCornack | June 1, 1937 |
| 2,244,182 | Allen | June 3, 1941 |
| 2,567,664 | Ewell | Sept. 11, 1951 |
| 2,593,597 | Palmer | Apr. 22, 1952 |
| 2,689,546 | Petri | Sept. 21, 1954 |
| 2,726,635 | Ferris | Dec. 13, 1955 |
| 2,754,801 | Reese | July 17, 1956 |

FOREIGN PATENTS

| | | |
|---|---|---|
| 444,477 | Great Britain | Mar. 13, 1936 |

OTHER REFERENCES

Pen-Type Dairy Barns by L. H. Brown, B. F. Cargill and B. R. Bookhaut, published by Michigan State College Special Bulletin 363 (first revision), Jan. 1952, Fig. 11, page 23.